Figure 1:
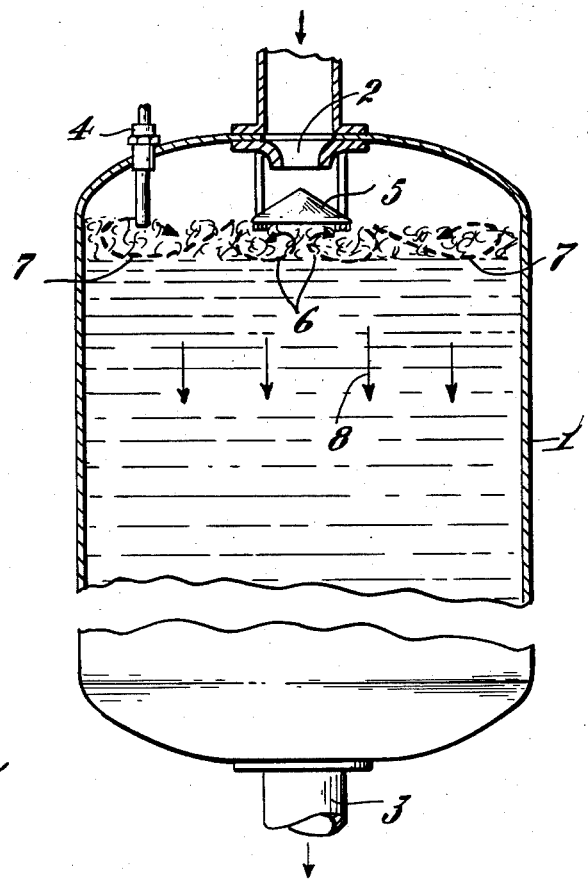

Aug. 13, 1963 F. O. W. G. MEYER 3,100,810
DISSOLVING GAS IN LIQUID
Filed July 29, 1960

INVENTOR.
Fritz O. W. G. Meyer
BY
Roberts, Cushman & Grover
ATT'YS

大專利 Office 3,100,810
Patented Aug. 13, 1963

3,100,810
DISSOLVING GAS IN LIQUID
Fritz O. W. G. Meyer, Stockholm, Sweden, assignor to
E. D. Jones Corporation, Pittsfield, Mass., a corporation of Delaware
Filed July 29, 1960, Ser. No. 46,282
2 Claims. (Cl. 261—115)

In various industrial processes it is desirable to dissolve gas in liquid, frequently to almost complete saturation in large volumes. Common examples include the solution of oxygen in communal or industrial waste waters and solution of different gases in liquids in the chemical industry. Heretofore it has been proposed to spray jets of water against the surface of liquid in a cylindrical tank, the jets being directed obliquely to the surface and circumferentially of the tank so as to beat the water into a coarse foam and cause the body of water to rotate about the axis of the tank and form a vortex. While this vortex assists in dissolving the gas in the foam, it also tends to carry away undissolved gas. The vortex also involves a relatively rapid flow of liquid through the tank so that insufficient time is afforded for maximum solution of gas.

Objects of the present invention are to dissolve gas in liquid continuously and rapidly, in large quantities and with low power consumption, and to minimize the amount of undissolved gas which is carried away by the liquid.

In one aspect the present invention involves a method which comprises continuously feeding liquid into the top of a tank having a vertical axis and out of the bottom of the tank at a rate to maintain a predetermined level in the tank with a gas-filled space above the liquid level, the liquid being fed into the space concentrically with the aforesaid axis and spread outwardly in the form of a cone meeting the surface of the liquid obliquely to form toroidal swirls, the toroid being approximately concentric with the axis. The conical jet of liquid should strike the aforesaid level at an acute angle. The space above the liquid level may be either open or closed and when closed the pressure of the gas in the space may be maintained higher than atmospheric pressure by feeding the gas under pressure. In the case of a closed tank the water level is not determined solely by the feeding of liquid into the tank but to a very marked extent also by the condition of the air cushion above the level of the liquid. As the gas in this cushion is gradually being dissolved the liquid level will rise if the gas is not replenished. On the other hand it is quite possible to increase or diminish the speed of flow of the liquid through the tank (without change of the level of the liquid) by means of a suitable level control, control of the static pressure of the liquid i.e. so that the gas pressure in the top of the tank is kept approximately constant or is suitably varied.

In another aspect the invention involves apparatus comprising a tank having a substantially vertical axis, the tank having an inlet at the top and a restricted outlet at the bottom so that liquid may be fed continuously through the tank with a predetermined level in the tank and a gas filled space above the liquid level, the inlet being approximately concentric with the axis, together with means for directing the incoming liquid outwardly in all directions through the aforesaid space to strike the surface of the liquid obliquely, thereby creating toroidal whirls approximately concentric with said axis. Preferably the aforesaid directing means comprises a conical surface disposed in the aforesaid space coaxially with the inlet and the axial distance from the periphery of the inlet to the conical surface is at least equal to the radius of the inlet.

Figure 2:
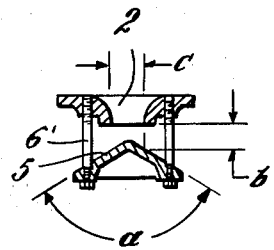

For the purpose of illustration a typical embodiment of the invention is shown in the accompanying drawing in which FIG. 1 is a vertical central section; and
FIG. 2 is a similar section of the inlet.

The particular embodiment of the invention chosen for the purpose of illustration comprises a tank 1 having an inlet 2 at the top, an outlet 3 at the bottom and a vent 4 through which the gas to be dissolved may be introduced. If the liquid is just to be oxygenated the tank may be merely vented to the atmosphere. In alignment with the inlet 2 is a conical baffle 5 supported on the inlet by means of rods 6'. Liquid is forced through the inlet at high velocity by means of a pump, gravity or other suitable means and liquid is withdrawn from the bottom of the tank at a rate such that the level of the liquid in the tank is maintained just below the baffle 5. If desired a valve may be installed in the outlet to regulate the rate at which liquid is withdrawn from the tank.

In FIG. 2 $a$ is the angle subtended by the conical baffle, $b$ is the distance between the edge of the inlet and the baffle and $c$ is the diameter of the inlet. For best results the angle $a$ should be about 110° to 120° and the distance $b$ should be at least as great as one-half the diameter $c$. With a tank having a diameter of 800 to 900 millimeters and the liquid entering the tank at a velocity of approximately 4 meters per second, a volume of approximately 2000 liters per minute can be treated very satisfactorily.

In operation the conical jet of liquid strikes the surface of the body of liquid in the tank at a small angle and sets up toroidal whirls as indicated by the broken lines 6 and 7 in FIG. 1, the toroid formed by the whirls being coaxial with the tank but the movement of the liquid being substantially entirely within radial planes. These whirls beat the surface strata of the liquid into a coarse foam, causing bubbles of the gas to be destroyed and reformed continually, thereby causing the gas in the space above the liquid to be absorbed rapidly. Inasmuch as the aforesaid whirls are confined to the surface strata of the liquid and are distributed evenly about the axis of the tank in the form of a toroid, the liquid below the surface strata may move downwardly uniformly throughout the entire cross-section of the tank as indicated by the arrows 8. Owing to the fact that the liquid settles slowly in the tank without appreciable rotation the minute bubbles of gas have time to be dissolved and the larger bubbles float to the top.

According to this invention liquid may be saturated to the desired degree with comparatively little power in a relatively small tank, chiefly because of low resistance resulting from the slow settling of the liquid in the tank.

By this method the kinetic energy of the conical jet of liquid is wholly absorbed by the surface strata of the liquid and utilized for the formation of foam, the liquid body in the tank moving downward with uniformity across the entire cross sectional area of the tank. In this way the maximum volume of the tank is utilized and each drop of liquid is retained in the tank for an identical period of time.

It should be understood that the present disclosure is for the purpose of illustration only and that this invention includes all modifications and equivalents which fall within the scope of the appended claims.

I claim:
1. For continuously dissolving gas in a liquid, apparatus comprising a tank having a substantially vertical axis, the tank having an inlet at the top, means for introducing liquid through the inlet at a high velocity and a restricted outlet at the bottom so that liquid may be fed continuously through the tank at a rate to maintain a body of liquid at a predetermined level in the tank and a space above the body, means for introducing a gas above the body and a conical baffle disposed between said inlet and said body substantially coaxially with the inlet and spaced from the inlet a distance at least as great as one-half the diameter of the inlet, the apex of the baffle being directed toward said inlet and the base of the baffle being disposed just above said level with the line of projection of the baffle surface meeting the level of the liquid beyond the area of the lower end of the baffle and inwardly of the walls of the tank so that the incoming liquid strikes the baffle and then the surface of said body obliquely along a circle around said base, whereby a toroid of swirls approximately concentric with said axis is created by introducing liquid through said inlet at high velocity.

2. The method of continuously dissolving gas in a body of liquid, wherein the liquid is confined in a tank having a liquid inlet and a liquid outlet and a conical baffle coaxial with the inlet and spaced therefrom a distance at least as great as one-half the diameter of the inlet which comprises introducing liquid to maintain a predetermined liquid level thus providing an exposed surface, the line of projection of the baffle surface meeting the level of the liquid beyond the area of the lower end of the baffle and inwardly of the walls of the tank, introducing a gas above the level of the liquid, introducing the liquid at a high velocity through the inlet and impinging the same upon the baffle and surface so that the conical sheet of liquid strikes the surface obliquely along a circle concentric with the body of the introduced liquid, thereby creating a toroid of whirls to absorb said gas, and withdrawing liquid from said body at the same rate of introduction.

References Cited in the file of this patent

UNITED STATES PATENTS

| | | |
|---|---|---|
| 1,868,632 | Edge | July 26, 1932 |
| 2,128,311 | Mertes | Aug. 30, 1938 |
| 2,588,677 | Welty et al. | Mar. 11, 1952 |
| 2,639,906 | Butler | May 26, 1953 |

FOREIGN PATENTS

| | | |
|---|---|---|
| 135,541 | Germany | Nov. 13, 1902 |
| 337,501 | Germany | June 3, 1921 |